United States Patent
Abuelsaad et al.

(10) Patent No.: US 9,584,491 B2
(45) Date of Patent: Feb. 28, 2017

(54) INTELLIGENT SECURITY ANALYSIS AND ENFORCEMENT FOR DATA TRANSFER

(71) Applicant: INTERNATIONAL BUSINESS MACHINES CORPORATION, Armonk, NY (US)

(72) Inventors: Kelly Abuelsaad, Somers, NY (US); Lisa Seacat DeLuca, Baltimore, MD (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/931,990

(22) Filed: Nov. 4, 2015

(65) Prior Publication Data
US 2016/0057115 A1 Feb. 25, 2016

Related U.S. Application Data

(62) Division of application No. 14/274,167, filed on May 9, 2014.

(51) Int. Cl.
*G06F 21/00* (2013.01)
*H04L 29/06* (2006.01)
(Continued)

(52) U.S. Cl.
CPC ........ *H04L 63/0428* (2013.01); *G06F 21/606* (2013.01); *H04L 63/105* (2013.01);
(Continued)

(58) Field of Classification Search
CPC ... H04L 63/0428; H04L 63/105; H04L 63/20; H04L 63/168; H04L 63/164;
(Continued)

(56) References Cited

U.S. PATENT DOCUMENTS 7,877,506 B2  1/2011  Curtis et al.
7,961,879 B1  6/2011  Spies et al.
(Continued)

FOREIGN PATENT DOCUMENTS

WO  2014193396  12/2014
WO  WO2014/193396 A1 * 12/2014

OTHER PUBLICATIONS

Syta, James M.; List of IBM Patents or Patent Applications Treated as Related; Nov. 4, 2015; 1 page.

*Primary Examiner* — Kendall Dolly
(74) *Attorney, Agent, or Firm* — Schmeiser, Olsen & Watts; William H. Hartwell

(57) ABSTRACT

An approach is provided for managing a message being transferred from a mobile device. A sensitivity level of data in the message payload is determined prior to sending the message to a wireless access point (WAP) en route to a destination device. If the payload data has a first sensitivity level, the mobile device sends the message to a first secure WAP having encryption at a threshold strength at a network layer and utilizes a protocol having encryption at an application layer. If the data has a second sensitivity level, the mobile device (a) sends the message to the first secure WAP without utilizing the protocol or (b) sends the message to a second, less secure WAP having encryption at a lesser strength and utilizes the protocol. If the data has a third sensitivity level, the mobile device sends the message to the second WAP without utilizing the protocol.

19 Claims, 4 Drawing Sheets

(51) Int. Cl.
*H04W 12/02* (2009.01)
*G06F 21/60* (2013.01)

(52) U.S. Cl.
CPC .......... *H04L 63/164* (2013.01); *H04L 63/166* (2013.01); *H04L 63/168* (2013.01); *H04L 63/20* (2013.01); *H04W 12/02* (2013.01); *G06F 2221/2113* (2013.01)

(58) Field of Classification Search
CPC ................ H04L 63/166; G06F 21/606; G06F 2221/2113; H04W 12/02
See application file for complete search history.

(56) References Cited

U.S. PATENT DOCUMENTS

| | | | |
|---|---|---|---|
| 8,078,882 B2* | 12/2011 | Singh | G06F 21/31 705/18 |
| 2003/0119484 A1* | 6/2003 | Adachi | H04L 63/04 455/411 |
| 2005/0130647 A1* | 6/2005 | Matsuda | G06F 3/1203 455/426.2 |
| 2009/0100184 A1 | 4/2009 | Chakra et al. | |
| 2012/0303558 A1* | 11/2012 | Jaiswal | G06N 99/005 706/12 |
| 2013/0036173 A1 | 2/2013 | Kuhlman et al. | |
| 2013/0046995 A1 | 2/2013 | Movshovitz | |
| 2013/0097421 A1* | 4/2013 | Lim | G06F 21/602 713/167 |
| 2015/0033283 A1* | 1/2015 | Mulder | H04L 63/20 726/1 |

* cited by examiner

INTELLIGENT SECURITY ANALYSIS AND ENFORCEMENT FOR DATA TRANSFER

This application is a divisional application claiming priority to Ser. No. 14/274,167 filed May 9, 2014.

TECHNICAL FIELD

The present invention relates generally to protecting sensitive data, and more specifically to protecting security of data sent via a wireless network.

BACKGROUND

Many users of mobile devices, such as a smartphones, computer tablets, and laptop computers, connect the devices to wireless networks to send and receive data. These wireless networks range in security levels from open, unsecured networks to secured networks with levels of encryption and security methods that vary in complexity. Sending data across a wireless network carries an inherent risk that the data in transit could be captured and viewed by unintended audiences. The severity of the aforementioned risk depends on at least two factors: (1) the sensitivity or confidentiality of the data and (2) the presence and effectiveness of (or the absence of) a security method and encryption on the data as it traverses the wireless network. A user is often unaware of the type of data being transferred and the level of security applied to a particular transfer, especially if the transfer is performed by a background process or an application that the user did not explicitly initiate. If any of the data being transferred is sensitive or confidential to the user and the network on which it is being transferred does not adequately protect the data, then the security and privacy of the user can be compromised.

Known network desktop firewalls are limited to performing a simple permit or deny of traffic based on general characteristics such as application, port and type of network to which the user is connected. For example, if the network desktop firewall detects that the user is on the user's company's intranet, then the firewall will allow certain applications such as file sharing. If the network desktop firewall detects that the user is on another network, then it will disable file sharing.

U.S. Pat. No. 7,877,506 to Curtis et al., issued Jan. 25, 2011, teaches automatic detection and encryption of sensitive data, such as a password in the payload of a message packet, which is performed by a gateway device, downstream of a sender of the message packet. If the message packet is not encrypted, a gateway device determines if the message packet is configured to determine if the data is sensitive, and if so, the gateway device determines the standard that governs the format of the message packet. Based on the standard, the gateway device determines the location of the data in the payload of the message packet. Subsequently, the gateway device determines whether the data is sensitive based on a match of the signature of the data within the payload to an entry in a table that associates data signatures with corresponding rules. If the gateway device is able to match the signature of the data to an entry in the table and the data is sensitive, the gateway device determines from its configuration file an Internet Protocol (IP) address of a network containing an encryption device and forwards the message packet to a virtual private network where the encryption device encrypts the message packet. The encryption device forwards the encrypted message packet to a router which routes the encrypted message packet to its destination through a non-secure network.

BRIEF SUMMARY

A first embodiment of the present invention is a method, computer system and computer program product for managing a message being transferred from a computer. The computer determines a level of sensitivity of data in a payload of the message and identifies an application initiating a transfer of the data in the message. The computer determines a level of security protecting the transfer of the data. The security is provided by network and application layers. Based in part on the level of sensitivity of the data, the computer determines whether the level of security satisfies a threshold level. If the level of security satisfies the threshold level, the computer connects and transfers the message using the level of security. If the level of security does not satisfy the threshold level, based at least in part on the level of sensitivity of the data and the level of security, the computer determines an action to change the level of security so that the changed level of security satisfies the threshold level, and in response, executes the action to connect the computer and transfer the message using the changed level of security.

A second embodiment of the present invention is a method, computer system and computer program product for managing a message being transferred from a mobile device. The mobile device determines a level of sensitivity of data in a payload of the message prior to the mobile device sending the message to a wireless access point en route to a destination device. If the data in the payload has a first level of sensitivity, the mobile device connects and sends the message to a first secure wireless access point having encryption at a threshold strength at a network layer and utilizes a protocol having encryption at an application layer. If the data in the payload has a second level of sensitivity lower than the first level of sensitivity, the mobile device (a) connects and sends the message to the first secure wireless access point having encryption at the threshold strength at the network layer without utilizing the protocol having encryption at the application layer or (b) connects and sends the message to a second, less secure wireless access point having encryption at a lesser strength and utilizes the protocol having encryption at the application layer. If the data in the payload has a third level of sensitivity lower than the second level of sensitivity, the mobile device connects and sends the message to the second wireless access point without utilizing the protocol.

Embodiments of the present invention provide an intelligent analysis of security needs for data transfer to or from a mobile device based on a range of dynamic characteristics such as data content. Based on the analysis of security needs, a particular strength of network layer encryption and/or application layer encryption is employed for the data transfer.

DETAILED DESCRIPTION

Overview

Embodiments of the present invention analyze and enforce a secure transfer of a message from a mobile device or other computer via a network to a destination device by determining the sensitivity of data in the message being transferred, detecting the level of security (or the absence of security) that protects the data in its transfer, and based on the sensitivity, level of security, and optionally on other criteria, determining an action to ensure the secure transfer of the message. The action may include employing a particular strength of encryption at the network layer and/or encryption at the application layer.

System for Managing Data Transferred from a Mobile Device

Figure 1:
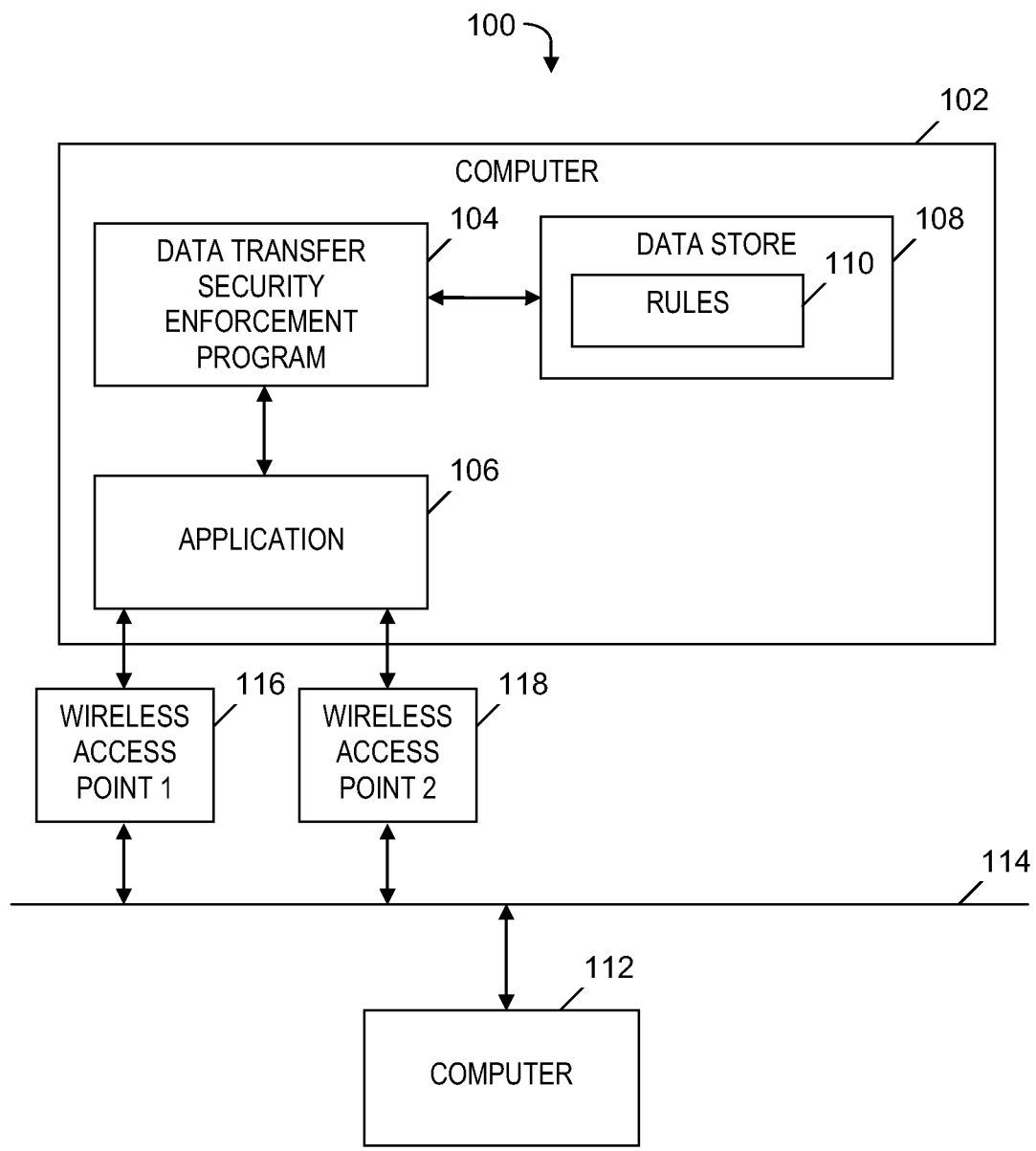
FIG. 1 is a block diagram of a system for managing a message being transferred from a computer, in accordance with embodiments of the present invention.

FIG. 1 is a block diagram of a system 100 for managing a message being transferred from a computer, in accordance with embodiments of the present invention. System 100 includes a computer 102, which executes a software-based data transfer security enforcement program 104 and a software application 106. In one embodiment, computer 102 is a mobile device, such as a smartphone, tablet computer, or laptop computer. Computer 102 is coupled to a data store 108, which includes rules 110. Computer 102 receives rules 110 from entries by a user of computer 102 or from an imported set of rules that is generated by a person or organization other than the user of computer 102. Computer 102 executes application 106 to transfer a message (not shown) whose payload includes data to a computer 112 acting as a destination device (i.e., destination of the message being transferred), and/or receive a message (not shown) whose payload includes data from computer 112 acting as a source device (i.e., source of the message being received). Application 106 transfers the message to computer 112 or receives a message from computer 112 via a wireless computer network 114. Before transferring the message, computer 102 (1) encrypts the message utilizing a protocol having encryption at an application layer (i.e., at a layer provided by application 106) or (2) utilizes another protocol to transfer the message that does not encrypt the message utilizing the aforementioned protocol.

Before the message is transferred over network 114, application 106 transfers the message to a first wireless access point 116 or a second wireless access point 118. A wireless access point is a device, such as a router, that provides access to a wireless network. First wireless access point 116 provides access to network 114 and encrypts a message received at wireless access point 116 using a first encryption technique at a network layer, where the first encryption technique has a level of strength at or above a predetermined threshold strength. Computer 102 receives the predetermined threshold strength from a user entry, a default threshold value, or a threshold value imported from an external source, and stores the threshold strength in data store 108.

Second wireless access point 118 provides access to network 114. Second wireless access point 118 is less secure than first wireless access point 116 because second wireless access point 118 encrypts a message received at second wireless access point 118 using a second encryption technique at a network layer, where the second encryption technique has a strength that is less than the strength of the first encryption technique used by first wireless access point 116. In one embodiment, the second network layer encryption technique used by second wireless access point 118 has a strength that is less than the aforementioned threshold strength.

Data transfer security enforcement program 104 determines a sensitivity of the data in the message transferred by application 106 to computer 112, and retrieves a rule from rules 110 that associates at least the sensitivity and current settings for application layer and network layer encryption of messages being transferred from application 106 with one or more actions that ensure the security of the message satisfies a predetermined threshold level of security. The rule may also associate source and/or destination addresses of the message and the application that is sending or receiving the data with the aforementioned one or more actions. Based on the retrieved rule, data transfer security enforcement program 104 determines whether application 106 encrypts the data in the message using the protocol having encryption at the application layer, and determines whether application utilizes (1) wireless access point 116, which has encryption at or above the threshold strength, or (2) the less secure wireless access point 118 to encrypt the data in the message.

Internal and external components of computer 102 are further described below relative to FIG. 4. The functionality of components of system 100 is further described below in the discussion relative to FIG. 2, FIG. 3, and FIG. 4.

Figure 2:
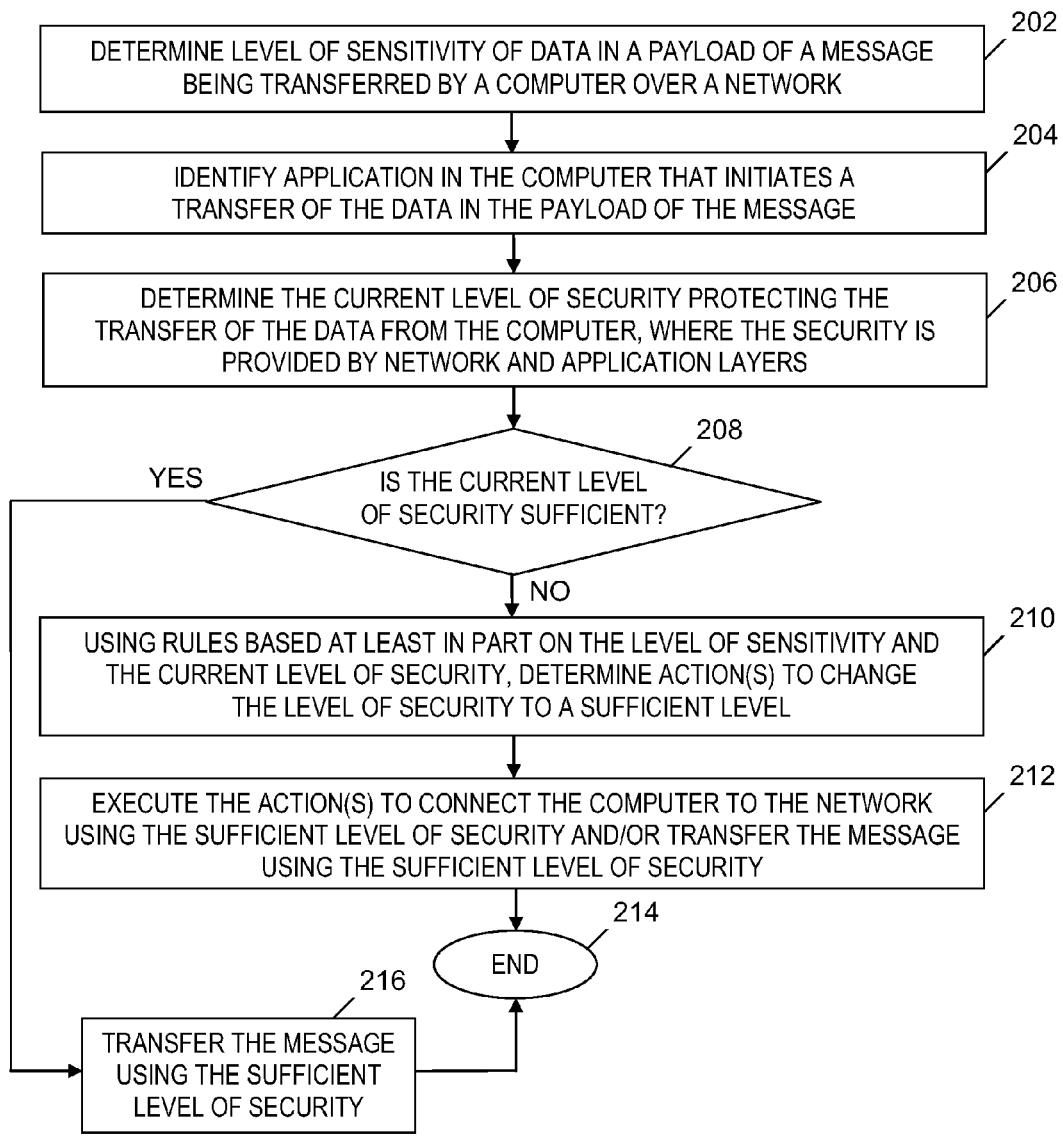
FIG. 2 is a flowchart of a first embodiment of a data transfer security enforcement program executed in a computer included in the system of FIG. 1, in accordance with embodiments of the present invention.

FIG. 2 is a flowchart of a first embodiment of data transfer security enforcement program 104 (see FIG. 1) executed in computer 102 (see FIG. 1) included in system 100 (see FIG. 1), in accordance with embodiments of the present invention. In step 202, data transfer security enforcement program 104 (see FIG. 1) determines a level of sensitivity of data in a payload of a message being transferred to computer 112 (see FIG. 1) via network 114 (see FIG. 1). In one embodiment, data transfer security enforcement program 104 (see FIG. 1) determines the level of sensitivity of the data based on the content, format or type of the data. For example, data transfer security enforcement program 104 (see FIG. 1) detects a password in plain text in the content of the data, and based on the detection of the password, determines that the data has a high level of sensitivity.

In step 204, data transfer security enforcement program 104 (see FIG. 1) identifies application 106 (see FIG. 1) as the application that initiates the transfer of message to computer 102 (see FIG. 1)

After step 204 and prior to step 206, data transfer security enforcement program 104 (see FIG. 1) determines whether computer 102 (see FIG. 1) is set to utilize wireless access point 116 or wireless access point 118 to transfer data (i.e., determines the strength of the network layer encryption that is currently set for computer 102 (see FIG. 1) and whether the strength satisfies a predetermined threshold strength) and determines whether application 106 is currently set to transfer data utilizing a protocol having encryption at the application layer. In step 206, based on the determinations of whether computer 102 (see FIG. 1) is set to utilize wireless access point 116 or wireless access point 118 and whether application 106 (see FIG. 1) is set to transfer data utilizing the protocol having encryption at the application layer, data transfer security enforcement program 104 (see FIG. 1)

determines a level of security that is currently protecting any message being transferred by application 106 (see FIG. 1).

Prior to step 208, computer 102 (see FIG. 1) receives rules 110 (see FIG. 1) and stores rules 110 (see FIG. 1) in data store 108 (see FIG. 1). After step 206 and prior to step 208, data transfer security enforcement program 104 (see FIG. 1) attempts to retrieve one or more rules from data store 108 (see FIG. 1) which include the sensitivity determined in step 202 and the current level of security determined in step 206 and based on the attempted retrieval of rule(s), determines whether the current level of security is sufficient. The current level of security is sufficient if: (1) data transfer security enforcement program 104 (see FIG. 1) retrieves rule(s) which indicate that no action is necessary for the sensitivity determined in step 202 and the current level of security determined in step 206 or (2) data transfer security enforcement program 104 (see FIG. 1) finds that none of rules 110 (see FIG. 1) in data store 108 (see FIG. 1) include conditions that match the sensitivity determined in step 202 and the current level of security determined in step 206. The current level of security is not sufficient if data transfer security enforcement program 104 (see FIG. 1) retrieves rule(s) that indicate action(s) to change the current level of security, where the rule(s) associate the action(s) with the sensitivity determined in step 202 and the current level of security determined in step 206.

In step 208, based on the attempt to retrieve rule(s) from data store 108 (see FIG. 1), data transfer security enforcement program 104 (see FIG. 1) determines whether the current level of security is sufficient. If data transfer security enforcement program 104 (see FIG. 1) determines in step 208 that the current level of security is not sufficient, then the No branch of step 208 is taken and step 210 is performed. Taking the No branch of step 208 means that data transfer security enforcement program 104 (see FIG. 1) has retrieved rule(s) from data store 108 (see FIG. 1) that indicate action(s) to change the current level of security.

In step 210, based on the retrieved rule(s), data transfer security enforcement program 104 (see FIG. 1) determines the action(s) included in the rule(s), where the action(s), when performed, change the current level of security for the transfer of the data in the message to a sufficient level of security. Action(s) determined in step 210 include one or more of: (1) finding a network that supports a level of security that satisfies the threshold level of security and connecting computer 102 (see FIG. 1) to the found network; (2) switching application 106 (see FIG. 1) from using a protocol that does not have encryption to a more secure protocol that has encryption at the application layer; (3) pausing data traffic being transferred from application 106 (see FIG. 1) until a more secure method of transferring the data is available (i.e., a protocol that has encryption at the application layer is available and/or a wireless access point, such as wireless access point 116 (see FIG. 1), which has encryption at a predetermined threshold strength at the network layer is available); (4) shutting down application 106 (see FIG. 1) and subsequently starting application 106 (see FIG. 1) again in response to a more secure method of transferring the data becoming available; (5) utilizing a third party software tool to provide a more secure method of transferring the data; and (6) shutting down application 106 (see FIG. 1) without restarting application 106 (see FIG. 1).

In one embodiment, data transfer security enforcement program 104 (see FIG. 1) determines in step 210 multiple actions and respective, multiple conditions in a rule, where data transfer security enforcement program 104 checks the conditions in a sequence determined by the rule, and selects an action from the multiple actions that corresponds to the first condition that data transfer security enforcement program 104 determines to be true. For example, using the list of (1) to (6) presented in the preceding paragraph, data transfer security enforcement program 104 (see FIG. 1) checks if (1) can be performed and if (1) can be performed, data transfer security enforcement program 104 (see FIG. 1) performs (1). If (1) cannot be performed, then data transfer security enforcement program 104 (see FIG. 1) checks if (2) can be performed, and if (2) can be performed, then data transfer security enforcement program 104 (see FIG. 1) performs (2). If (1) and (2) cannot be performed, then data transfer security enforcement program 104 (see FIG. 1) either performs (3) or (4) until (1) or (2) becomes possible to perform, or performs (5) if possible, or performs (6).

In one embodiment, data transfer security enforcement program 104 determines in step 210 determines the action(s) based on a rule that specifies all or any combination of the following criteria: (1) an IP address or other address of computer 102 (see FIG. 1) which is a source of the message; (2) an IP address or other address of computer 112 (see FIG. 1), which is a destination of the message; (3) the particular application that initiates the transfer of the message from computer 102 (see FIG. 1) to computer 112 (see FIG. 1) via network 114 (see FIG. 1); (4) content of the data included in the payload of the message (e.g., content is a password or a credit card number); (5) a first method of encryption at a network layer that is applied by a wireless access point that provides access to network 114 (see FIG. 1) or a condition in which no method of encryption is applied at the network layer; (6) a second method of encryption that is applied at an application layer by a protocol utilized by application 106 (see FIG. 1) in a transfer of data from computer 102 (see FIG. 1) to computer 112 (see FIG. 1) via network 114 (see FIG. 1).

As one example relative to (1) and (2) listed above, data transfer security enforcement program 104 (see FIG. 1) in step 210 determines that the address of computer 102 (see FIG. 1) and the address of computer 112 (see FIG. 1) are both within a home network of the user of computer 102 (see FIG. 1) because the user is transferring data from the user's smartphone to the user's home computer, and based on the source and destination addresses being within the home network, data transfer security enforcement program 104 (see FIG. 1) retrieves a rule from data store 108 (see FIG. 1) that specifies an action of employing a minimal level of security (or no security) for the transfer of the data.

As one example relative to (3) listed above, data transfer security enforcement program 104 (see FIG. 1) in step 210 determines that application 106 (see FIG. 1) that initiated the transfer of the data is Application XYZ, which is known to access confidential information, and based on application 106 (see FIG. 1) being Application XYZ, data transfer security enforcement program 104 (see FIG. 1) retrieves a rule from data store 108 (see FIG. 1) that specifies an action of sending the data to wireless access point 116 (see FIG. 1) because wireless access point 116 (see FIG. 1) has encryption at the threshold strength at the network layer.

The first method of encryption at the network layer in (5) listed above may include, for example, (a) no encryption (e.g., the data is transferred over an open WiFi network); (b) less secure encrypted method such as a 64-bit key Wired Equivalent Privacy (WEP) security control; (c) more secure encrypted method such as a WiFi Protected Access II (WPA2) protocol; and (d) using a cellular network for the transfer of the data instead of transferring the data over a WiFi network.

The second method of encryption at the application layer in (6) listed above may include, for example, employing a Hypertext Transfer Protocol Secure (https) protocol instead of Hypertext Transfer Protocol (http) or employing a Secure File Transfer Protocol (sftp) instead of a File Transfer Protocol (ftp).

In step 212, data transfer security enforcement program 104 (see FIG. 1) executes the action(s) determined in step 210 to connect computer 102 (see FIG. 1) to network 114 (see FIG. 1) and transfer the message over network 114 (see FIG. 1) to computer 112 (see FIG. 1), so that the message is transferred using a sufficient level of security. Alternatively, application 106 (see FIG. 1) executes the action(s) as described above.

Following step 212, the process of FIG. 2 ends at step 214.

Returning to step 208, if data transfer security enforcement program 104 (see FIG. 1) determines in step 208 that the current level of security is sufficient, then the Yes branch of step 208 is taken and step 216 is performed.

In step 216, data transfer security enforcement program 104 (see FIG. 1) transfers the message to computer 112 (see FIG. 1) using the current level of security, without any change to the current level of security. Following step 216, the process of FIG. 2 ends at step 214.

In one embodiment, data transfer security enforcement program 104 (see FIG. 1) scans the content of the data after application 106 (see FIG. 1) initiates the transfer of the data to computer 112 (see FIG. 1), but before the data has started to pass through network 114 (see FIG. 1). Based on the scanned content, data transfer security enforcement program 104 (see FIG. 1) identifies the data as being a particular type of data included in a predetermined list of types of data (e.g., identifies the data as being a password). In this embodiment, step 202 includes data transfer security enforcement program 104 (see FIG. 1) determining the level of sensitivity of the data based on the identified type of data and step 210 includes data transfer security enforcement program 104 (see FIG. 1) determining the action based on a rule retrieved from data store 108 (see FIG. 1) that associates the action with the identified type of data.

In an alternate embodiment, the No branch of step 208 is followed by a step in which data transfer security enforcement program 104 (see FIG. 1) notifies the user of the need for one or more actions to provide a more secure transfer for the data. In another alternate embodiment, step 210 is followed by a step in which data transfer security enforcement program 104 (see FIG. 1) prompts the user to send an acceptance or rejection of the action(s) determined in step 210. In response to a receipt of the acceptance of the action(s), data transfer security enforcement program 104 (see FIG. 1) performs step 212. In response to a receipt of the rejection of the action(s), data transfer security enforcement program 104 (see FIG. 1) does not perform step 212, but instead continues the process of FIG. 2 at step 216.

Figure 3:
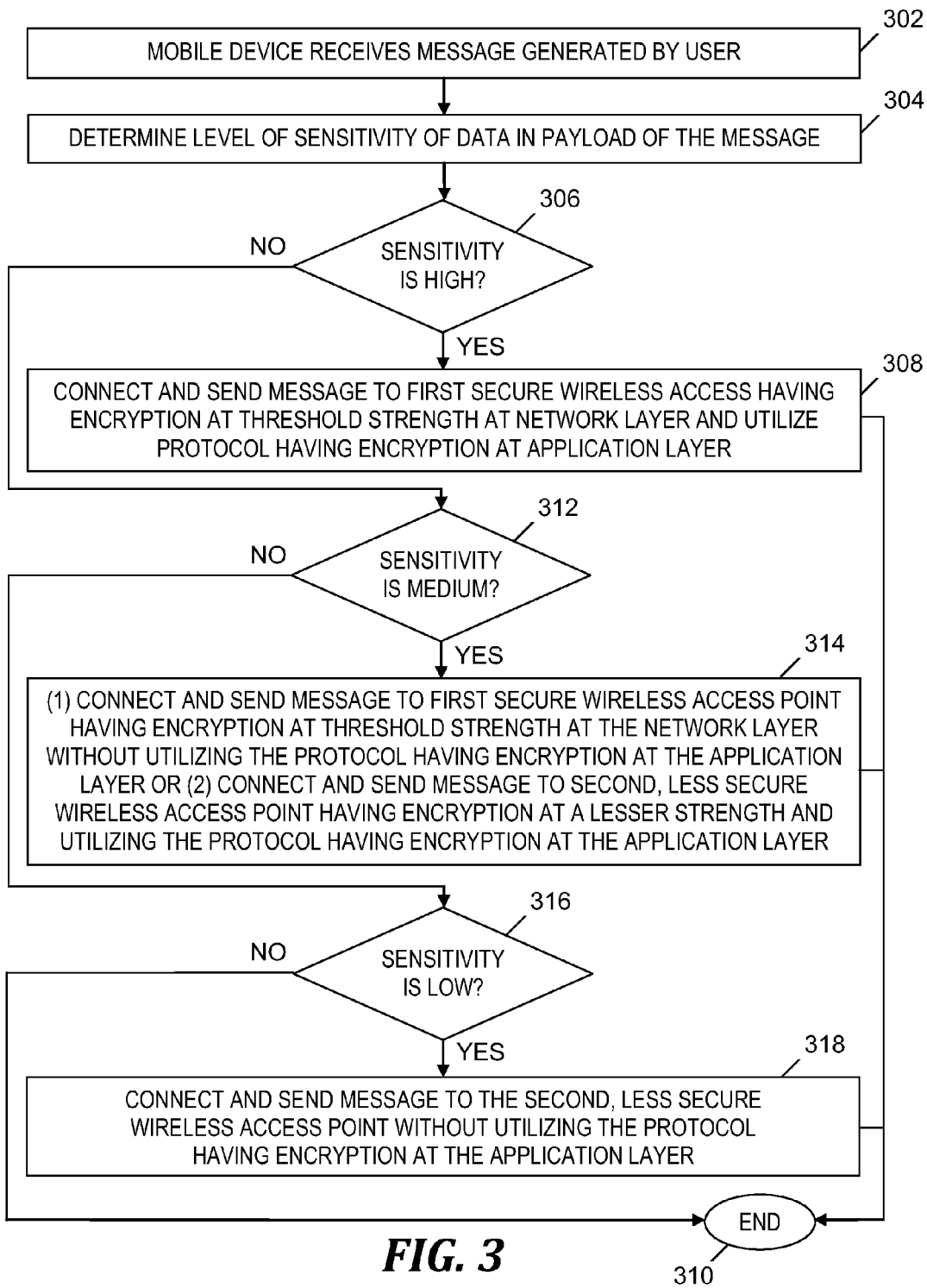
FIG. 3 is a flowchart of a second embodiment of a data transfer security enforcement program executed in a mobile device included in the system of FIG. 1, in accordance with embodiments of the present invention.

FIG. 3 is a flowchart of a second embodiment of data transfer security enforcement program 104 (see FIG. 1) executed in mobile device 102 (see FIG. 1) included in system 100 (see FIG. 1), in accordance with embodiments of the present invention. In step 302, data transfer security enforcement program 104 (see FIG. 1) receives a message generated by a user of mobile device 102 (see FIG. 1).

In step 304, data transfer security enforcement program 104 (see FIG. 1) determines a sensitivity of data in a payload of the message received in step 302. In one embodiment, data transfer security enforcement program 104 (see FIG. 1) determines the level of sensitivity of the data based on the content or format of the data. For example, data transfer security enforcement program 104 (see FIG. 1) detects a password in plain text in the content of the data, and based on the detection of the password, determines that the data has a high level of sensitivity.

In step 306, data transfer security enforcement program 104 (see FIG. 1) determines whether the level of sensitivity determined in step 304 is a first level of sensitivity (i.e., a high level of sensitivity of data). If data transfer security enforcement program 104 (see FIG. 1) determines in step 306 that the level of sensitivity of the data is the first level of sensitivity, then the Yes branch of step 306 is taken and step 308 is performed.

In step 308, data transfer security enforcement program 104 (see FIG. 1) connects mobile device 102 (see FIG. 1) and sends the message to first wireless access point 116 (see FIG. 1) which applies encryption to the message at the threshold strength at the network layer. The sending of the message by data transfer security enforcement program 104 (see FIG. 1) in step 308 utilizes a protocol that applies encryption to the message at the application layer. Following step 308, the process of FIG. 3 ends at step 310.

Returning to step 306, if data transfer security enforcement program 104 (see FIG. 1) determines that the level of sensitivity determined in step 304 is not the first level of sensitivity, then the No branch of step 306 is taken and step 312 is performed.

In step 312, data transfer security enforcement program 104 (see FIG. 1) determines whether the level of sensitivity determined in step 304 is the second level of sensitivity (i.e., a medium level of sensitivity of data), where the second level of sensitivity is lower than the first level of sensitivity. If data transfer security enforcement program 104 (see FIG. 1) determines the level of sensitivity is the second level of sensitivity, then the Yes branch of step 312 is taken and step 314 is performed.

In step 314, data transfer security enforcement program 104 (see FIG. 1) either (1) connects mobile device 102 (see FIG. 1) and sends the message to first wireless access point 116 (see FIG. 1) which applies encryption at the threshold strength to the message at the network layer, where the sending of the message by data transfer security enforcement program 104 (see FIG. 1) does not utilize the protocol that applies encryption to the message at the application layer, or (2) connects mobile device 102 (see FIG. 1) and sends the message to second wireless access point 118 (see FIG. 1), which applies encryption at a strength less than the strength of the encryption applied by first wireless access point 116 (see FIG. 1), where the sending of the message by data transfer security enforcement program 104 (see FIG. 1) utilizes the protocol that applies encryption to the message at the application layer. Following step 314, the process of FIG. 3 ends at step 310.

In another embodiment, step 314 includes data transfer security enforcement program 104 (see FIG. 1) performing only connecting mobile device 102 (see FIG. 1) and sending the message to first wireless access point 116 (see FIG. 1), where the sending of the message does not utilize the protocol that applies encryption to the message at the application layer (i.e., performs only (1) listed above). In still another embodiment, step 314 includes data transfer security enforcement program 104 (see FIG. 1) performing only the steps of connecting mobile device 102 (see FIG. 1) and sending the message to second wireless access point 118 (see FIG. 1), where the sending of the message utilizes the protocol that applies encryption to the message at the application layer.

Returning to step 312, if data transfer security enforcement program 104 (see FIG. 1) determines that the level of sensitivity determined in step 304 is not the second level of sensitivity, then the No branch of step 312 is taken and step 316 is performed.

In step 316, data transfer security enforcement program 104 (see FIG. 1) determines whether the level of sensitivity determined in step 304 is the third level of sensitivity (i.e., a low level of sensitivity of data), where the third level of sensitivity is lower than the second level of sensitivity. If data transfer security enforcement program 104 (see FIG. 1) determines in step 316 that the level of sensitivity is the third level of sensitivity, then the Yes branch of step 316 is taken and step 318 is performed.

In step 318, data transfer security enforcement program 104 (see FIG. 1) connects mobile device 102 (see FIG. 1) and sends the message to second wireless access point 118 (see FIG. 1) which applies encryption at the network layer at a strength lower than the strength of the encryption applied by first wireless access point 116 (see FIG. 1). In one embodiment, the strength of the encryption applied by second wireless access point 118 (see FIG. 1) is less than the aforementioned threshold strength. The sending of the message by data transfer security enforcement program 104 (see FIG. 1) in step 318 does not utilize the protocol that applies encryption to the message at the application layer. Following step 318, the process of FIG. 3 ends at step 310.

EXAMPLE

As one example, data transfer security enforcement program 104 (see FIG. 1) detects a password in plain text in a message whose transfer from computer 102 (see FIG. 1) to computer 112 (see FIG. 1) has been initiated by application 106 (see FIG. 1). Data transfer security enforcement program 104 (see FIG. 1) determines that the current level of security for transfer of messages from application 106 (see FIG. 1) running on computer 102 (see FIG. 1) utilizes a protocol that is not secure at the application layer, and utilizes a network that is not secure. Based on the detected password, data transfer security enforcement program 104 (see FIG. 1) determines that the data in the message has a first level of sensitivity. Data transfer security enforcement program 104 (see FIG. 1) finds a rule included in rules 110 that associates the first level of sensitivity and the current level of security with a sequence of actions to attempt: (1) switch the current protocol to an encrypted protocol that has encryption at the application layer if the encrypted protocol is available; (2) if the encrypted protocol in (1) is not available, then switch the network to a secure network that has encryption at the threshold strength; (3) if the secure network in (2) is not available, then use a third party application that transfers data securely and that computer 112 (see FIG. 1) accepts; and (4) if using the third party application in (3) is not possible, then data transfer security enforcement program 104 (see FIG. 1) shuts down application 106 (see FIG. 1) and monitors the state of computer 102 (see FIG. 1) periodically and start application 106 (see FIG. 1) again and apply the action in (1), (2) or (3) listed above if the respective condition mentioned in (1), (2) or (3) is true.

Computer System

Figure 4:
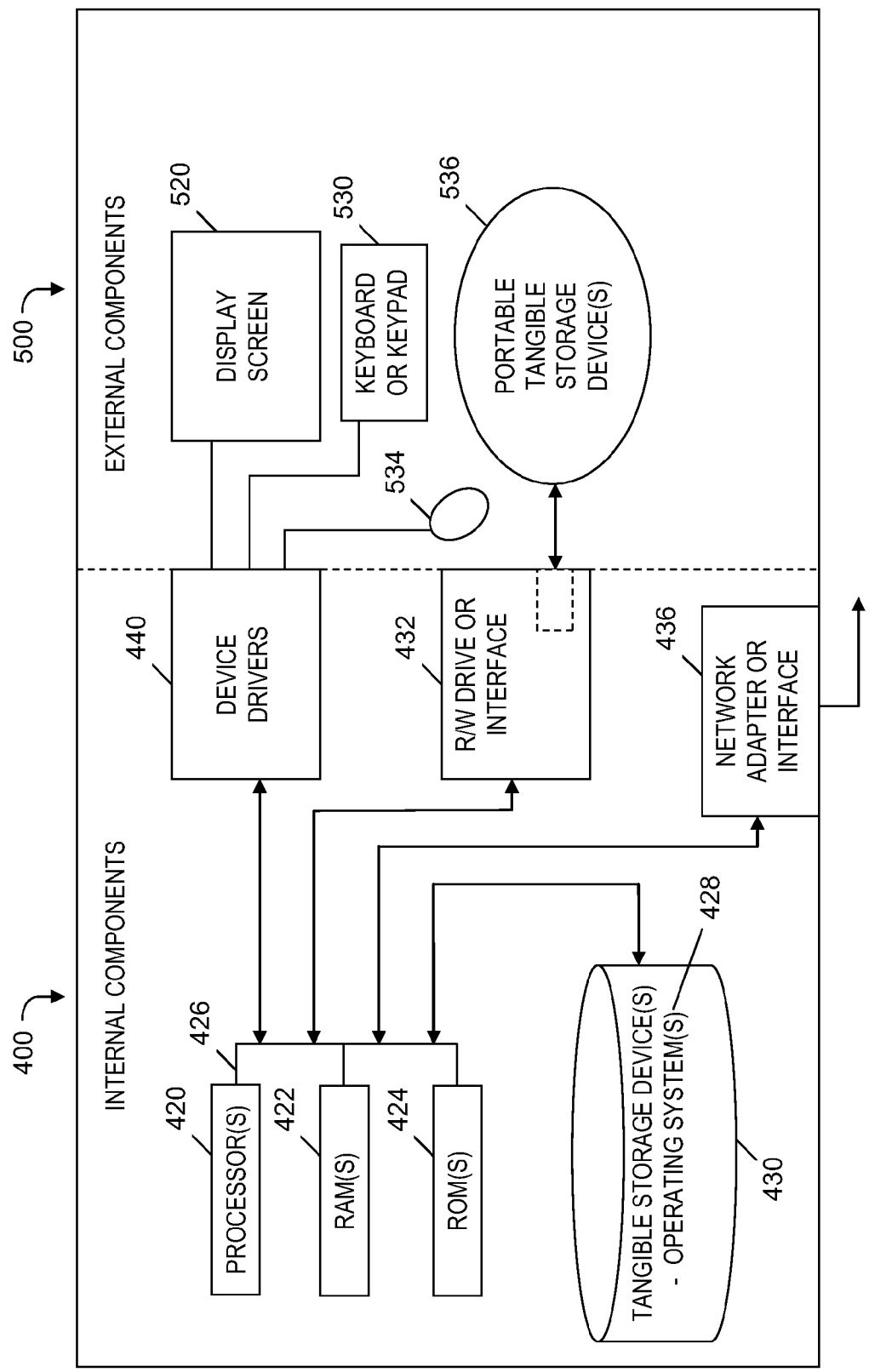
FIG. 4 is a block diagram of components of a computer included in the system of FIG. 1 for managing a message being transferred from the computer, in accordance with embodiments of the present invention.

FIG. 4 is a block diagram of components of computer 102 (see FIG. 1) included in system 100 (see FIG. 1) for managing a message being transferred from computer 102 (see FIG. 1), in accordance with embodiments of the present invention. Computer 102 (see FIG. 1) includes sets of internal components 400 and external components 500 illustrated in FIG. 4. The set of internal components 400 includes one or more processors 420, one or more computer-readable random access memories (RAMs) 422 and one or more computer-readable read-only memories (ROMs) 424 on one or more buses 426, one or more operating systems 428 and one or more computer-readable storage devices 430. The operating system(s) 428 and program instructions 104 and 106 (for computer 102 in FIG. 1) are stored on one or more of the respective computer-readable storage devices 430 for execution by one or more of the respective processors 420 via one or more of the respective RAMs 422 (which typically include cache memory). In the illustrated embodiment, each of the computer-readable storage devices 430 is a magnetic disk storage device of an internal hard drive. Alternatively, each of the computer-readable storage devices 430 is a semiconductor storage device such as ROM 424, erasable programmable read-only memory (EPROM), flash memory or any other computer-readable storage device that can store but does not transmit a computer program and digital information.

The set of internal components 400 also includes a read/write (R/W) drive or interface 432 to read from and write to one or more portable tangible computer-readable storage devices 536 that can store but do not transmit a computer program, such as a CD-ROM, DVD, memory stick, magnetic tape, magnetic disk, optical disk or semiconductor storage device. The program instructions 104 and 106 (for computer 102 in FIG. 1) can be stored on one or more of the respective portable tangible computer-readable storage devices 536, read via the respective R/W drive or interface 432 and loaded into the respective hard drive or semiconductor storage device 430. The terms "computer-readable storage device" and "computer-readable storage devices" do not mean signal propagation media such as copper cables, optical fibers and wireless transmission media.

The set of internal components 400 also includes a network adapter or interface 436 such as a transmission control protocol/Internet protocol (TCP/IP) adapter card or wireless communication adapter (such as a 4G wireless communication adapter using orthogonal frequency-division multiple access (OFDMA) technology). The programs 104 and 106 (for computer 102 in FIG. 1) can be downloaded to computer 102 (see FIG. 1) from an external computer or external computer-readable storage device via a network (for example, the Internet, a local area network or other, wide area network or wireless network) and network adapter or interface 436. From the network adapter or interface 436, the program 104 (see FIG. 1) and program 106 (see FIG. 1) are loaded into the respective hard drive or semiconductor storage device 430. The network may comprise copper wires, optical fibers, wireless transmission, routers, firewalls, switches, gateway computers and/or edge servers.

The set of external components 500 includes a display screen 520, a keyboard or keypad 530, and a computer mouse or touchpad 534. The set of internal components 400 also includes device drivers 440 to interface to display screen 520 for imaging, to keyboard or keypad 530, to computer mouse or touchpad 534, and/or to the display screen for pressure sensing of alphanumeric character entry and user selections. The device drivers 440, R/W drive or interface 432 and network adapter or interface 436 comprise hardware and software (stored in storage device 430 and/or ROM 424.

The program 104 (see FIG. 1) and program 106 (see FIG. 1) can be written in various programming languages (such as C++) including low-level, high-level, object-oriented or non-object-oriented languages. Alternatively, the functions of program 112 (see FIG. 1) can be implemented in whole or in part by computer circuits and other hardware (not shown).

Based on the foregoing, a computer system, method and program product have been disclosed for managing a message being transferred from a computer. However, numerous modifications and substitutions can be made without deviating from the scope of the present invention. Therefore, the present invention has been disclosed by way of example and not limitation.

What is claimed is:

1. A method of managing a message being transferred from a mobile device, the method comprising the steps of:
   the mobile device determining a level of sensitivity of data in a payload of the message prior to the mobile device sending the message to a wireless access point en route to a destination device;
   if the data in the payload has a first level of sensitivity, the mobile device connecting and sending the message to a first secure wireless access point having encryption at a threshold strength at a network layer and utilizing a protocol having encryption at an application layer;
   if the data in the payload has a second level of sensitivity lower than the first level of sensitivity, the mobile device (a) connecting and sending the message to the first secure wireless access point having encryption at the threshold strength at the network layer without utilizing the protocol having encryption at the application layer or (b) connecting and sending the message to a second, less secure wireless access point having encryption at a strength less than the threshold strength at the network layer and utilizing the protocol having encryption at the application layer; and
   if the data in the payload has a third level of sensitivity lower than the second level of sensitivity, the mobile device connecting and sending the message to the second wireless access point without utilizing the protocol having encryption at the application layer.

2. The method of claim 1, wherein the step of determining the level of sensitivity of the data includes determining a format of the data in the payload matches a first, second, or third predetermined format of content of data,
   wherein the step of connecting and sending the message to the first secure wireless access point having encryption at the threshold strength at the network layer and utilizing the protocol having encryption at the application layer is performed if the format of the data matches the first predetermined format,
   wherein the step of (a) connecting and sending the message to the first secure wireless access point having encryption at the threshold strength at the network layer without utilizing the protocol having encryption at the application layer or (b) connecting and sending the message to the second wireless access point having encryption at the strength less than the threshold strength at the network layer and utilizing the protocol having encryption at the application layer is performed if the format of the data matches the second predetermined format, and
   wherein the step of connecting and sending the message to the second wireless access point without utilizing the protocol having encryption at the application layer is performed if the format of the data matches the third predetermined format.

3. The method of claim 1, further comprising the steps of:
   the mobile device determining a first setting of the mobile device to utilize the second wireless access point;
   the mobile device determining a second setting of the mobile device to transfer data utilizing the protocol having encryption at the application layer;
   based on the first and second settings, the mobile device determining a current level of security protecting messages transferred from the mobile device;
   the mobile device determining that the data in the payload has the first level of sensitivity;
   the mobile device retrieving a rule that specifies the current level of security and the first level of sensitivity;
   the mobile device determining the rule indicates an action to change the current level of security to a different level of security; and
   the mobile device performing the action by performing, based on the rule, the step of connecting and sending the message to the first secure wireless access point and utilizing the protocol having the encryption at the application layer.

4. The method of claim 1, further comprising the steps of:
   the mobile device determining a first setting of the mobile device to utilize the second wireless access point;
   the mobile device determining a second setting of the mobile device to transfer data utilizing the protocol having encryption at the application layer;
   based on the first and second settings, the mobile device determining a current level of security protecting messages transferred from the mobile device;
   the mobile device determining that the data in the payload has the second level of sensitivity;
   the mobile device retrieving a rule that specifies the current level of security and the second level of sensitivity;
   the mobile device determining the rule indicates an action to change the current level of security to a different level of security; and
   the mobile device performing the action by performing, based on the rule, the step of connecting and sending the message to the first secure wireless access point having encryption at the threshold strength at the network layer without utilizing the protocol having encryption at the application layer.

5. The method of claim 1, further comprising the steps of:
   the mobile device determining a first setting of the mobile device to utilize the first secure wireless access point or the second wireless access point;
   the mobile device determining a second setting of the mobile device to transfer data utilizing the protocol having encryption at the application layer;
   based on the first and second settings, the mobile device determining a current level of security protecting messages transferred from the mobile device;
   the mobile device determining that the data in the payload has the second level of sensitivity;
   the mobile device retrieving a rule that specifies the current level of security and the second level of sensitivity;
   the mobile device determining the rule indicates an action to change the current level of security to a different level of security; and
   the mobile device performing the action by performing, based on the rule, the step of connecting and sending the message to the second wireless access point having encryption at the strength less than the threshold strength at the network layer and utilizing the protocol having encryption at the application layer.

6. The method of claim 1, further comprising the steps of:
the mobile device determining a first setting of the mobile device to utilize the first secure wireless access point or the second wireless access point;
the mobile device determining a second setting of the mobile device to transfer data utilizing the protocol having encryption at the application layer;
based on the first and second settings, the mobile device determining a current level of security protecting messages transferred from the mobile device;
the mobile device determining that the data in the payload has the second level of sensitivity;
the mobile device retrieving a rule that specifies the current level of security and the second level of sensitivity;
the mobile device determining the rule indicates an action to change the current level of security to a more secure level of security; and
the mobile device performing the action by performing, based on the rule, the step of connecting and sending the message to the second wireless access point having encryption at the strength less than the threshold strength at the network layer without utilizing the protocol having encryption at the application layer.

7. The method of claim 1, further comprising the step of:
providing at least one support service for at least one of creating, integrating, hosting, maintaining, and deploying computer-readable program code in the computer, the program code being executed by a processor of the mobile device to implement the steps of determining the level of sensitivity of the data in the payload, if the data in the payload has the first level of sensitivity, connecting and sending the message to the first secure wireless access point having encryption at the threshold strength at the network layer and utilizing the protocol having encryption at the application layer, if the data in the payload has the second level of sensitivity, (a) connecting and sending the message to the first secure wireless access point having encryption at the threshold strength at the network layer without utilizing the protocol having encryption at the application layer or (b) connecting and sending the message to the second wireless access point having encryption at the strength less than the threshold strength at the network layer and utilizing the protocol having encryption at the application layer, and if the data in the payload has the third level of sensitivity, connecting and sending the message to the second wireless access point without utilizing the protocol having encryption at the application layer.

8. A computer program product, comprising:
a computer-readable, storage device; and
a computer-readable program code stored in the computer-readable, storage device, the computer-readable program code containing instructions that are executed by a central processing unit (CPU) of a mobile device to implement a method of managing a message being transferred from the mobile device, the method comprising the steps of:
the mobile device determining a level of sensitivity of data in a payload of the message prior to the mobile device sending the message to a wireless access point en route to a destination device;
if the data in the payload has a first level of sensitivity, the mobile device connecting and sending the message to a first secure wireless access point having encryption at a threshold strength at a network layer and utilizing a protocol having encryption at an application layer;
if the data in the payload has a second level of sensitivity lower than the first level of sensitivity, the mobile device (a) connecting and sending the message to the first secure wireless access point having encryption at the threshold strength at the network layer without utilizing the protocol having encryption at the application layer or (b) connecting and sending the message to a second, less secure wireless access point having encryption at a strength less than the threshold strength at the network layer and utilizing the protocol having encryption at the application layer; and
if the data in the payload has a third level of sensitivity lower than the second level of sensitivity, the mobile device connecting and sending the message to the second wireless access point without utilizing the protocol having encryption at the application layer.

9. The computer program product of claim 8, wherein the step of determining the level of sensitivity of the data includes determining a format of the data in the payload matches a first, second, or third predetermined format of content of data,
wherein the step of connecting and sending the message to the first secure wireless access point having encryption at the threshold strength at the network layer and utilizing the protocol having encryption at the application layer is performed if the format of the data matches the first predetermined format,
wherein the step of (a) connecting and sending the message to the first secure wireless access point having encryption at the threshold strength at the network layer without utilizing the protocol having encryption at the application layer or (b) connecting and sending the message to the second wireless access point having encryption at the strength less than the threshold strength at the network layer and utilizing the protocol having encryption at the application layer is performed if the format of the data matches the second predetermined format, and
wherein the step of connecting and sending the message to the second wireless access point without utilizing the protocol having encryption at the application layer is performed if the format of the data matches the third predetermined format.

10. The computer program product of claim 8, wherein the method further comprises the steps of:
the mobile device determining a first setting of the mobile device to utilize the second wireless access point;
the mobile device determining a second setting of the mobile device to transfer data utilizing the protocol having encryption at the application layer;
based on the first and second settings, the mobile device determining a current level of security protecting messages transferred from the mobile device;
the mobile device determining that the data in the payload has the first level of sensitivity;
the mobile device retrieving a rule that specifies the current level of security and the first level of sensitivity;
the mobile device determining the rule indicates an action to change the current level of security to a different level of security; and
the mobile device performing the action by performing, based on the rule, the step of connecting and sending the message to the first secure wireless access point and utilizing the protocol having the encryption at the application layer.

11. The computer program product of claim 8, wherein the method further comprises the steps of:
the mobile device determining a first setting of the mobile device to utilize the second wireless access point;
the mobile device determining a second setting of the mobile device to transfer data utilizing the protocol having encryption at the application layer;
based on the first and second settings, the mobile device determining a current level of security protecting messages transferred from the mobile device;
the mobile device determining that the data in the payload has the second level of sensitivity;
the mobile device retrieving a rule that specifies the current level of security and the second level of sensitivity;
the mobile device determining the rule indicates an action to change the current level of security to a different level of security; and
the mobile device performing the action by performing, based on the rule, the step of connecting and sending the message to the first secure wireless access point having encryption at the threshold strength at the network layer without utilizing the protocol having encryption at the application layer.

12. The computer program product of claim 8, wherein the method further comprises the steps of:
the mobile device determining a first setting of the mobile device to utilize the first secure wireless access point or the second wireless access point;
the mobile device determining a second setting of the mobile device to transfer data utilizing the protocol having encryption at the application layer;
based on the first and second settings, the mobile device determining a current level of security protecting messages transferred from the mobile device;
the mobile device determining that the data in the payload has the second level of sensitivity;
the mobile device retrieving a rule that specifies the current level of security and the second level of sensitivity;
the mobile device determining the rule indicates an action to change the current level of security to a different level of security; and
the mobile device performing the action by performing, based on the rule, the step of connecting and sending the message to the second wireless access point having encryption at the strength less than the threshold strength at the network layer and utilizing the protocol having encryption at the application layer.

13. The computer program product of claim 8, wherein the method further comprises the steps of:
the mobile device determining a first setting of the mobile device to utilize the first secure wireless access point or the second wireless access point;
the mobile device determining a second setting of the mobile device to transfer data utilizing the protocol having encryption at the application layer;
based on the first and second settings, the mobile device determining a current level of security protecting messages transferred from the mobile device;
the mobile device determining that the data in the payload has the second level of sensitivity;
the mobile device retrieving a rule that specifies the current level of security and the second level of sensitivity;
the mobile device determining the rule indicates an action to change the current level of security to a more secure level of security; and
the mobile device performing the action by performing, based on the rule, the step of connecting and sending the message to the second wireless access point having encryption at the strength less than the threshold strength at the network layer without utilizing the protocol having encryption at the application layer.

14. A mobile device comprising:
a central processing unit (CPU);
a memory coupled to the CPU; and
a computer readable storage device coupled to the CPU, the storage device containing instructions that are executed by the CPU via the memory to implement a method of managing a message being transferred from a mobile device, the method comprising the steps of:
the mobile device determining a level of sensitivity of data in a payload of the message prior to the mobile device sending the message to a wireless access point en route to a destination device;
if the data in the payload has a first level of sensitivity, the mobile device connecting and sending the message to a first secure wireless access point having encryption at a threshold strength at a network layer and utilizing a protocol having encryption at an application layer;
if the data in the payload has a second level of sensitivity lower than the first level of sensitivity, the mobile device (a) connecting and sending the message to the first secure wireless access point having encryption at the threshold strength at the network layer without utilizing the protocol having encryption at the application layer or (b) connecting and sending the message to a second, less secure wireless access point having encryption at a strength less than the threshold strength at the network layer and utilizing the protocol having encryption at the application layer; and
if the data in the payload has a third level of sensitivity lower than the second level of sensitivity, the mobile device connecting and sending the message to the second wireless access point without utilizing the protocol having encryption at the application layer.

15. The mobile device of claim 14, wherein the step of determining the level of sensitivity of the data includes determining a format of the data in the payload matches a first, second, or third predetermined format of content of data,
wherein the step of connecting and sending the message to the first secure wireless access point having encryption at the threshold strength at the network layer and utilizing the protocol having encryption at the application layer is performed if the format of the data matches the first predetermined format,
wherein the step of (a) connecting and sending the message to the first secure wireless access point having encryption at the threshold strength at the network layer without utilizing the protocol having encryption at the application layer or (b) connecting and sending the message to the second wireless access point having encryption at the strength less than the threshold strength at the network layer and utilizing the protocol having encryption at the application layer is performed if the format of the data matches the second predetermined format, and wherein the step of connecting and sending the message to the second wireless access point without utilizing the protocol having encryption at the application layer is performed if the format of the data matches the third predetermined format.

16. The mobile device of claim 14, wherein the method further comprises the steps of:

the mobile device determining a first setting of the mobile device to utilize the second wireless access point;

the mobile device determining a second setting of the mobile device to transfer data utilizing the protocol having encryption at the application layer;

based on the first and second settings, the mobile device determining a current level of security protecting messages transferred from the mobile device;

the mobile device determining that the data in the payload has the first level of sensitivity;

the mobile device retrieving a rule that specifies the current level of security and the first level of sensitivity;

the mobile device determining the rule indicates an action to change the current level of security to a different level of security; and the mobile device performing the action by performing, based on the rule, the step of connecting and sending the message to the first secure wireless access point and utilizing the protocol having the encryption at the application layer.

17. The mobile device of claim 14, wherein the method further comprises the steps of:

the mobile device determining a first setting of the mobile device to utilize the second wireless access point;

the mobile device determining a second setting of the mobile device to transfer data utilizing the protocol having encryption at the application layer;

based on the first and second settings, the mobile device determining a current level of security protecting messages transferred from the mobile device;

the mobile device determining that the data in the payload has the second level of sensitivity;

the mobile device retrieving a rule that specifies the current level of security and the second level of sensitivity;

the mobile device determining the rule indicates an action to change the current level of security to a different level of security; and the mobile device performing the action by performing, based on the rule, the step of connecting and sending the message to the first secure wireless access point having encryption at the threshold strength at the network layer without utilizing the protocol having encryption at the application layer.

18. The mobile device of claim 14, wherein the method further comprises the steps of:

the mobile device determining a first setting of the mobile device to utilize the first secure wireless access point or the second wireless access point;

the mobile device determining a second setting of the mobile device to transfer data utilizing the protocol having encryption at the application layer;

based on the first and second settings, the mobile device determining a current level of security protecting messages transferred from the mobile device;

the mobile device determining that the data in the payload has the second level of sensitivity;

the mobile device retrieving a rule that specifies the current level of security and the second level of sensitivity;

the mobile device determining the rule indicates an action to change the current level of security to a different level of security; and the mobile device performing the action by performing, based on the rule, the step of connecting and sending the message to the second wireless access point having encryption at the strength less than the threshold strength at the network layer and utilizing the protocol having encryption at the application layer.

19. The mobile device of claim 14, wherein the method further comprises the steps of:

the mobile device determining a first setting of the mobile device to utilize the first secure wireless access point or the second wireless access point;

the mobile device determining a second setting of the mobile device to transfer data utilizing the protocol having encryption at the application layer;

based on the first and second settings, the mobile device determining a current level of security protecting messages transferred from the mobile device;

the mobile device determining that the data in the payload has the second level of sensitivity;

the mobile device retrieving a rule that specifies the current level of security and the second level of sensitivity;

the mobile device determining the rule indicates an action to change the current level of security to a more secure level of security; and the mobile device performing the action by performing, based on the rule, the step of connecting and sending the message to the second wireless access point having encryption at the strength less than the threshold strength at the network layer without utilizing the protocol having encryption at the application layer.

* * * * *